(12) United States Patent
Hada et al.

(10) Patent No.: US 11,215,819 B2
(45) Date of Patent: Jan. 4, 2022

(54) HEAD-UP DISPLAY

(71) Applicant: NIPPON SEIKI CO., LTD., Niigata (JP)

(72) Inventors: Makoto Hada, Niigata (JP); Yuki Masuya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 381 days.

(21) Appl. No.: 16/346,409

(22) PCT Filed: Nov. 6, 2017

(86) PCT No.: PCT/JP2017/039948
§ 371 (c)(1),
(2) Date: Apr. 30, 2019

(87) PCT Pub. No.: WO2018/088362
PCT Pub. Date: May 17, 2018

(65) Prior Publication Data
US 2019/0258057 A1    Aug. 22, 2019

(30) Foreign Application Priority Data
Nov. 11, 2016   (JP) .............................. JP2016-220434

(51) Int. Cl.
*G02B 27/01* (2006.01)
*B60K 35/00* (2006.01)
*G09F 9/00* (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS 5,864,432 A * 1/1999 Deter ................. G02B 27/0101
                                                359/634
2010/0066832 A1   3/2010 Nagahara et al.
(Continued)

FOREIGN PATENT DOCUMENTS

JP    2006-142897 A    6/2006
JP    2010-070066 A    4/2010
(Continued)

OTHER PUBLICATIONS

International Search Report issued in corresponding International Patent Application No. PCT/JP2017/039948, dated Feb. 6, 2018, with English Translation.

*Primary Examiner* — William R Alexander
*Assistant Examiner* — Sharrief I Broome
(74) *Attorney, Agent, or Firm* — McDermott Will & Emery LLP

(57) ABSTRACT

The present invention is capable of making it difficult to perceive the narrowness of a display area of a virtual image. Provided is a head-up display which projects display light on a transmission/reflection part to display a first virtual image in an area in which the virtual image can be displayed, said area being superimposed on an actual view outside of a vehicle, wherein, when deviation occurs in the relative positions of the actual view and the transmission/reflection part from the perspective of a viewer, a control unit enlarges a virtual image display area, which sets the range in which
(Continued)

the first virtual image is displayed within the area in which the virtual image can be displayed, so as to be larger than normal.

10 Claims, 7 Drawing Sheets

(52) U.S. Cl.
CPC ........ *G09F 9/00* (2013.01); *B60K 2370/1529* (2019.05); *B60K 2370/167* (2019.05); *B60K 2370/23* (2019.05); *B60K 2370/334* (2019.05); *G02B 2027/014* (2013.01); *G02B 2027/0134* (2013.01); *G02B 2027/0159* (2013.01); *G02B 2027/0198* (2013.01)

(58) Field of Classification Search
CPC .... G02B 2027/0118; G02B 2027/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06T 19/006; G06T 2207/10028; G06T 2219/016; G06T 7/529; G06T 19/20; G06T 3/20; G06T 5/00; G06T 5/006; G06F 3/013; G06F 3/017; G06F 1/163; G06F 3/011; G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/334; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/23; B60K 2370/25; B60K 2370/52; G06K 9/00671; G06K 9/00604; G06K 9/00691; G06K 9/00704; G06K 9/2063; G06K 9/2081; G06K 9/209; G06K 9/00597; G06K 9/00805; G02C 11/10; G02C 2200/06; G02C 2200/08; G02C 5/126; G02C 5/20; G02C 7/16; G02C 1/10; G02C 2200/18; G02C 2202/20; G02C 3/02; G02C 5/124; G02C 5/143; G02C 5/146; G02C 5/16; G02C 7/04; G02C 7/086; G02C 7/101; G02C 7/102; G02C 7/12; G02C 9/04; B32B 2307/1253; B32B 2307/416; B32B 2307/42; B32B 2551/00; B32B 2551/08; B32B 37/1284; B32B 37/24; B32B 38/0008; B32B 17/061; B60R 1/00; B60R 2300/205; B60R 11/0235; B60R 11/0229; B60R 2011/0094; B60R 1/12; B60R 2001/1253; B60R 2011/0005; B60R 2011/0026; B60R 2011/0035; B60R 2011/0059; B60R 2011/008; H04N 13/344; H04N 5/332; H04N 5/33; H04N 5/64; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; H04N 9/3161; G09G 3/3208; G09G 2310/0235; G09G 2320/0626; G09G 2340/0471; G09G 2340/0478; G09G 2360/144; G09G 3/2003; G09G 3/3225; G09G 3/3233; G09G 3/36; G09G 2300/0478; G09G 2310/08; G09G 2320/0252; G09G 2320/041; G09G 2320/10; G09G 2340/0407; G09G 3/001; G09G 3/002; G09G 3/18; G09G 3/32
See application file for complete search history.

(56) References Cited

U.S. PATENT DOCUMENTS

| | | | |
|---|---|---|---|
| 2010/0073636 A1* | 3/2010 | Sasaki .................... | G02B 30/26 353/13 |
| 2010/0164702 A1* | 7/2010 | Sasaki .................... | G01B 21/22 340/438 |
| 2013/0050655 A1* | 2/2013 | Fujikawa ........... | G02B 27/0101 353/38 |
| 2014/0055866 A1* | 2/2014 | Cheng ..................... | G02B 5/04 359/633 |
| 2018/0143431 A1* | 5/2018 | Matsuura ........... | G02B 27/0093 |

FOREIGN PATENT DOCUMENTS

| | | |
|---|---|---|
| JP | 2010-156608 A | 7/2010 |
| JP | 2012-035745 A | 2/2012 |

\* cited by examiner

[Fig.1]
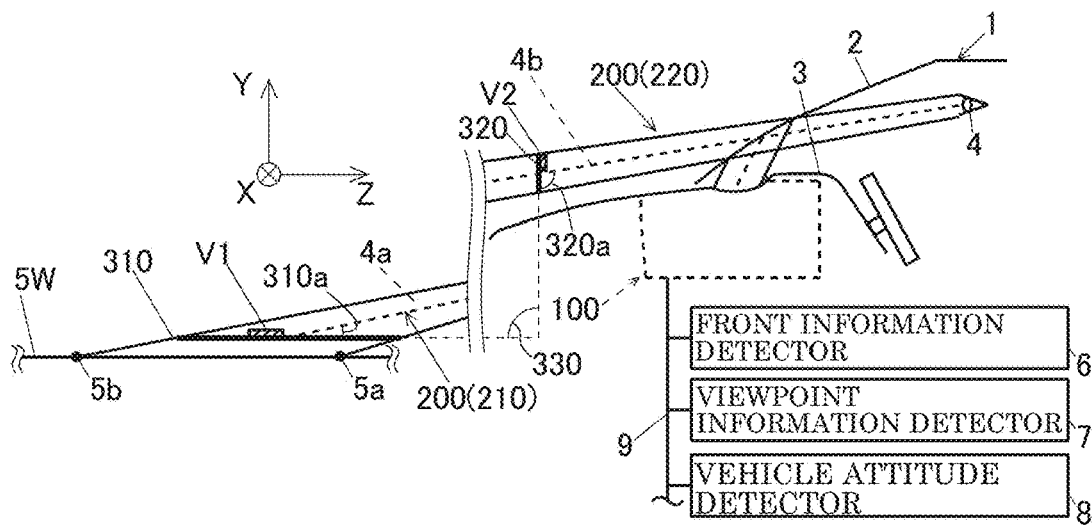
[Fig.2]
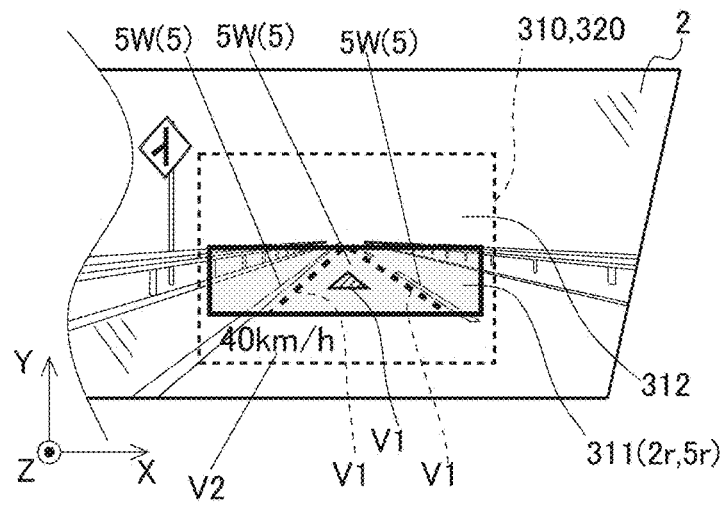
[Fig.3]
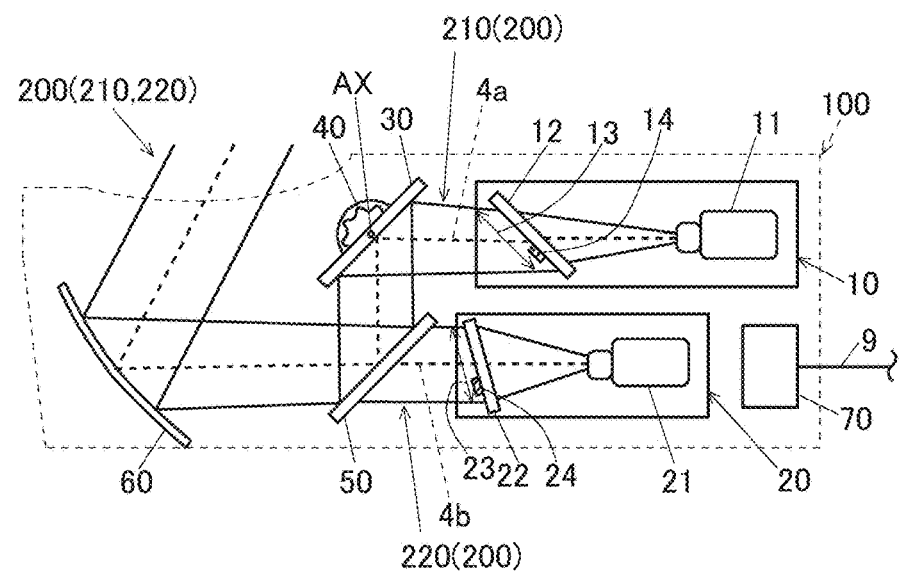

[Fig.4]
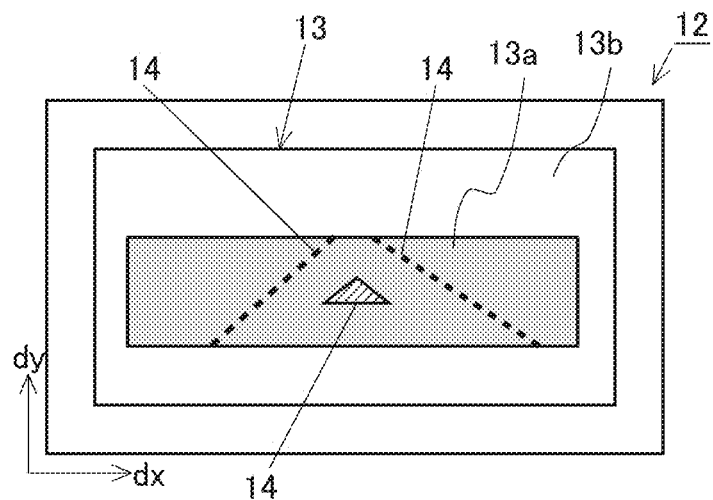
[Fig.5]
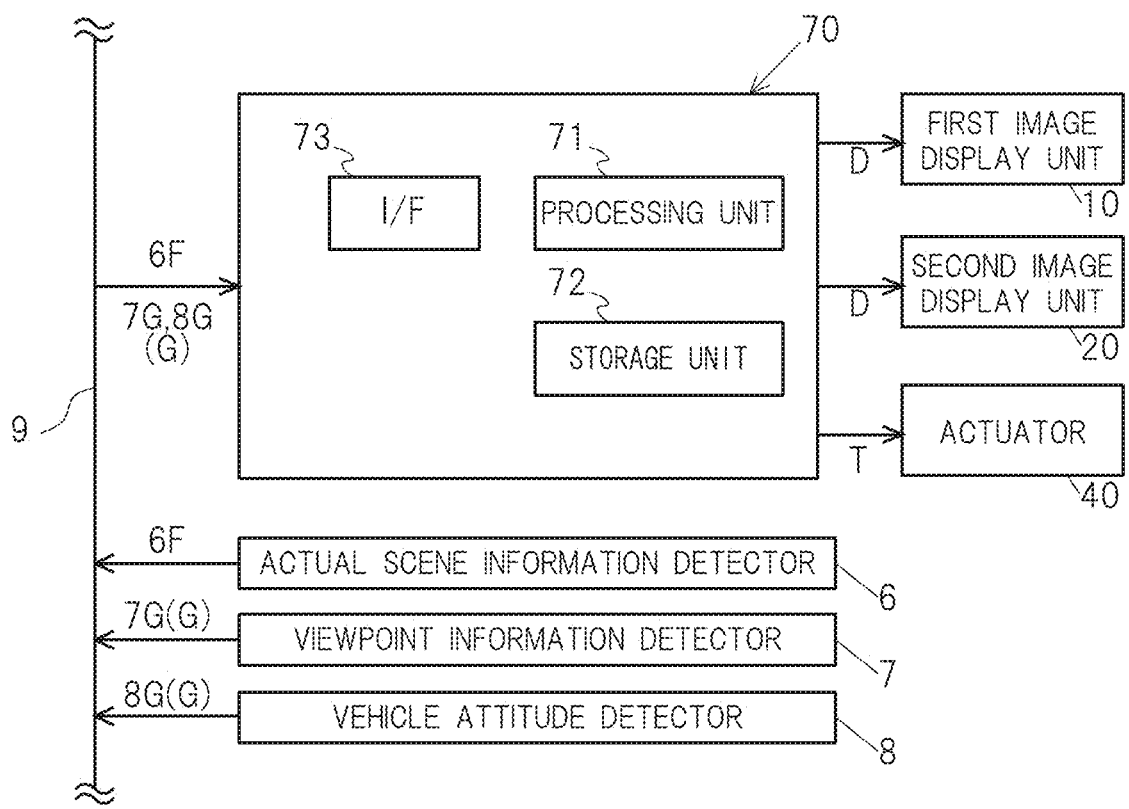

[Fig.6]
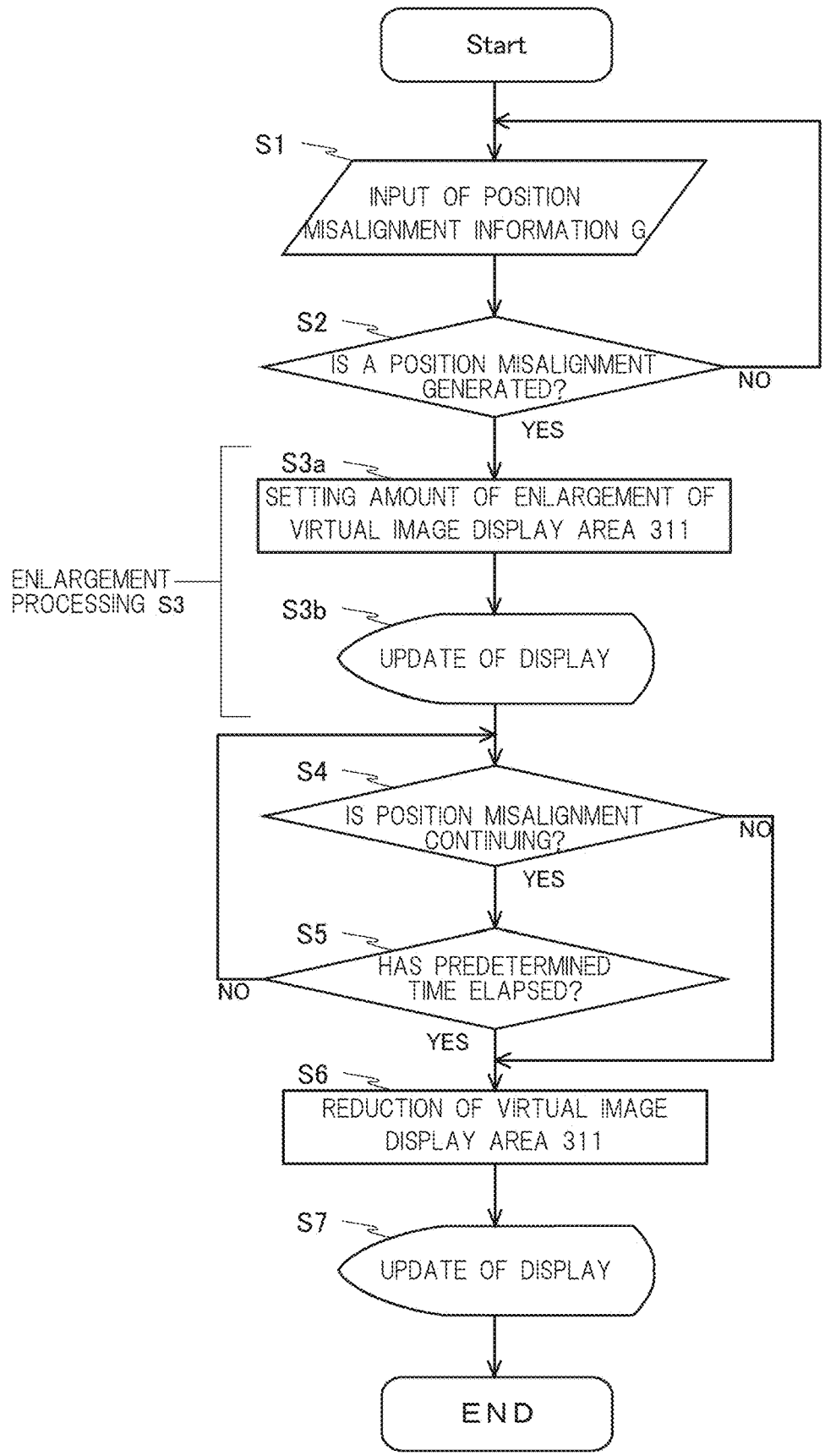

[Fig.7]
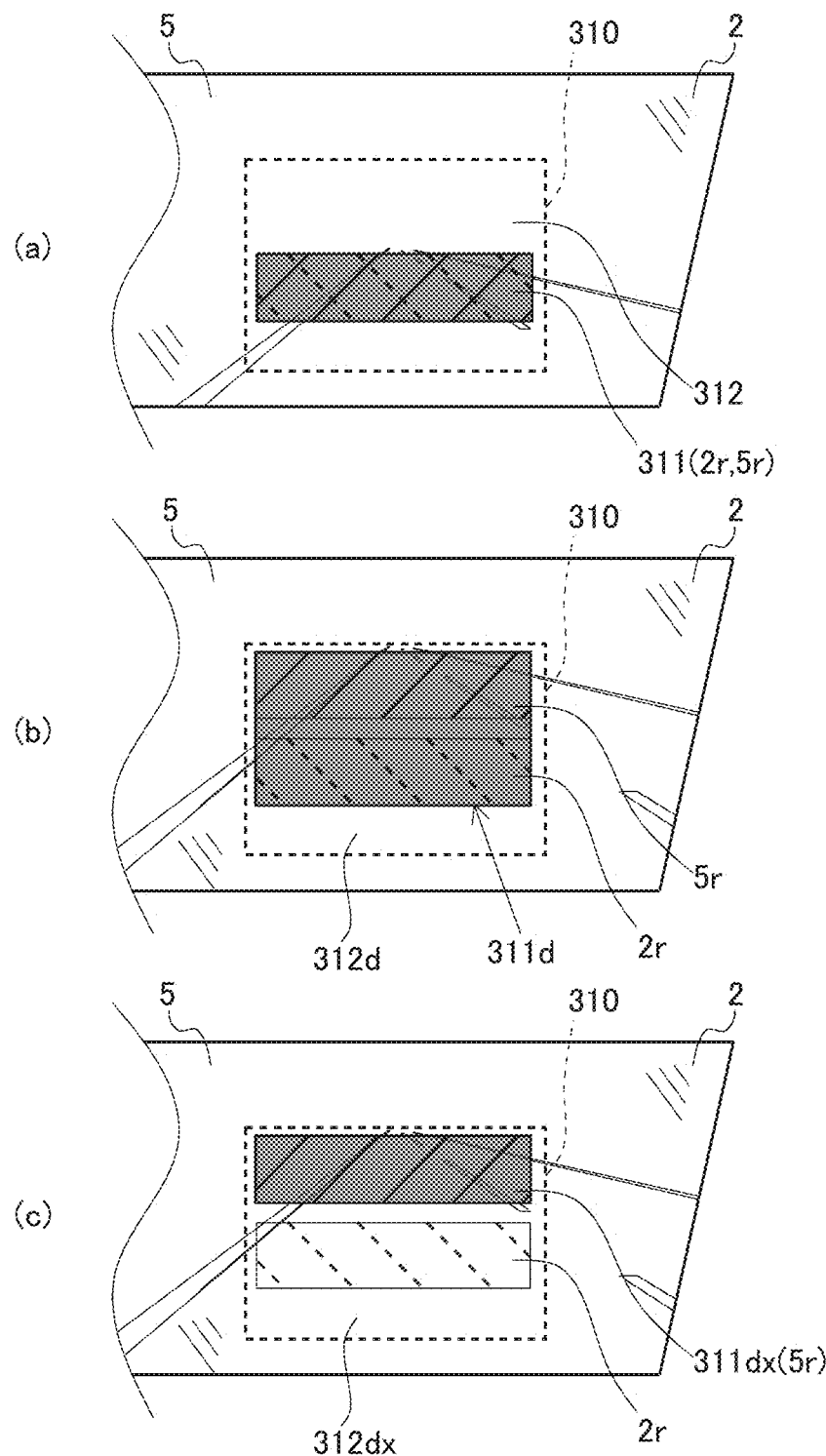

[Fig.8A]
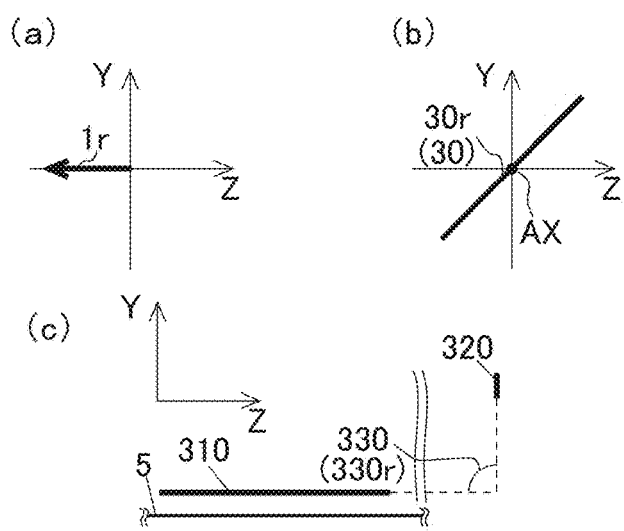
[Fig.8B]
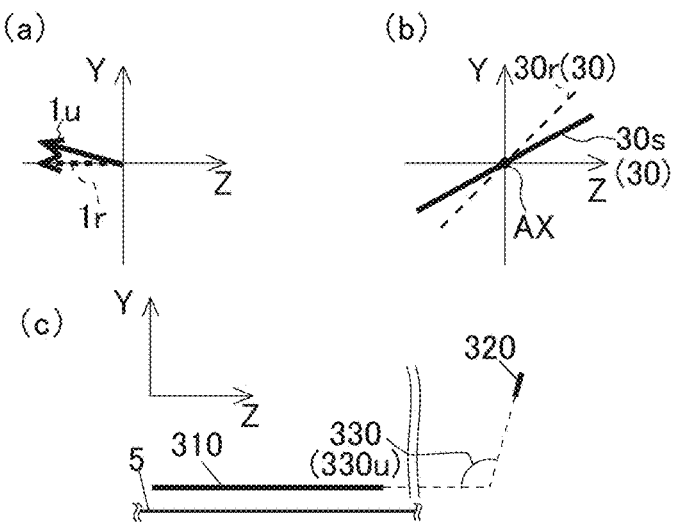
[Fig.8C]
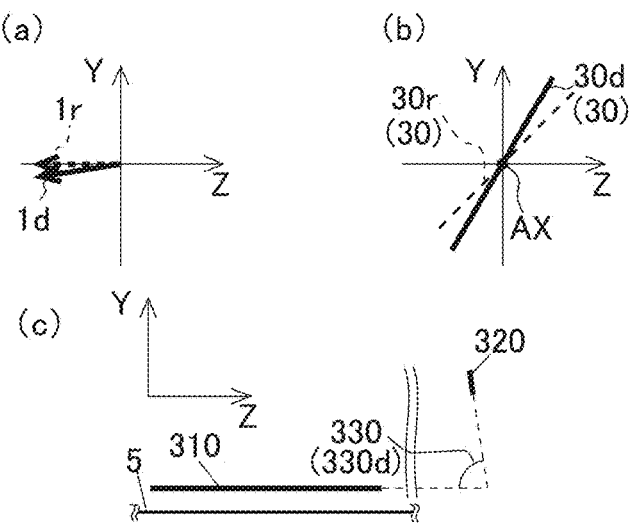

[Fig.9]
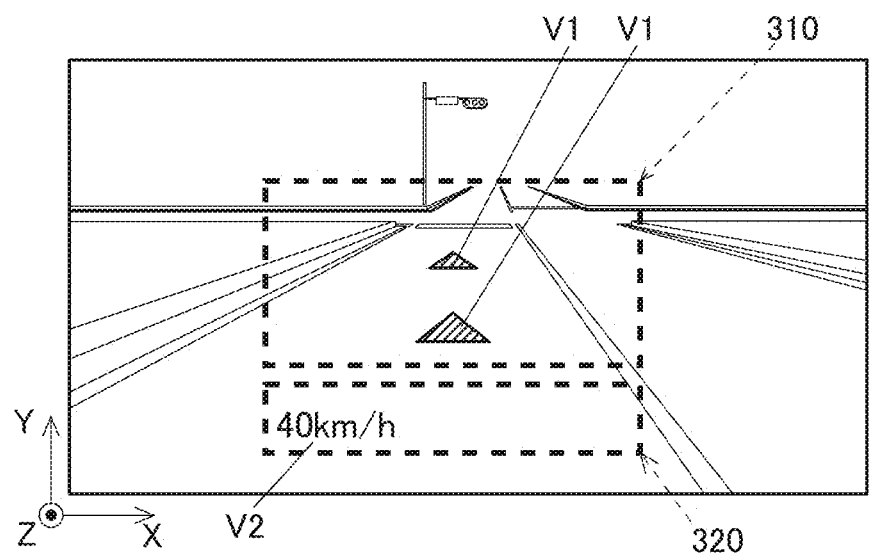

[Fig.10]
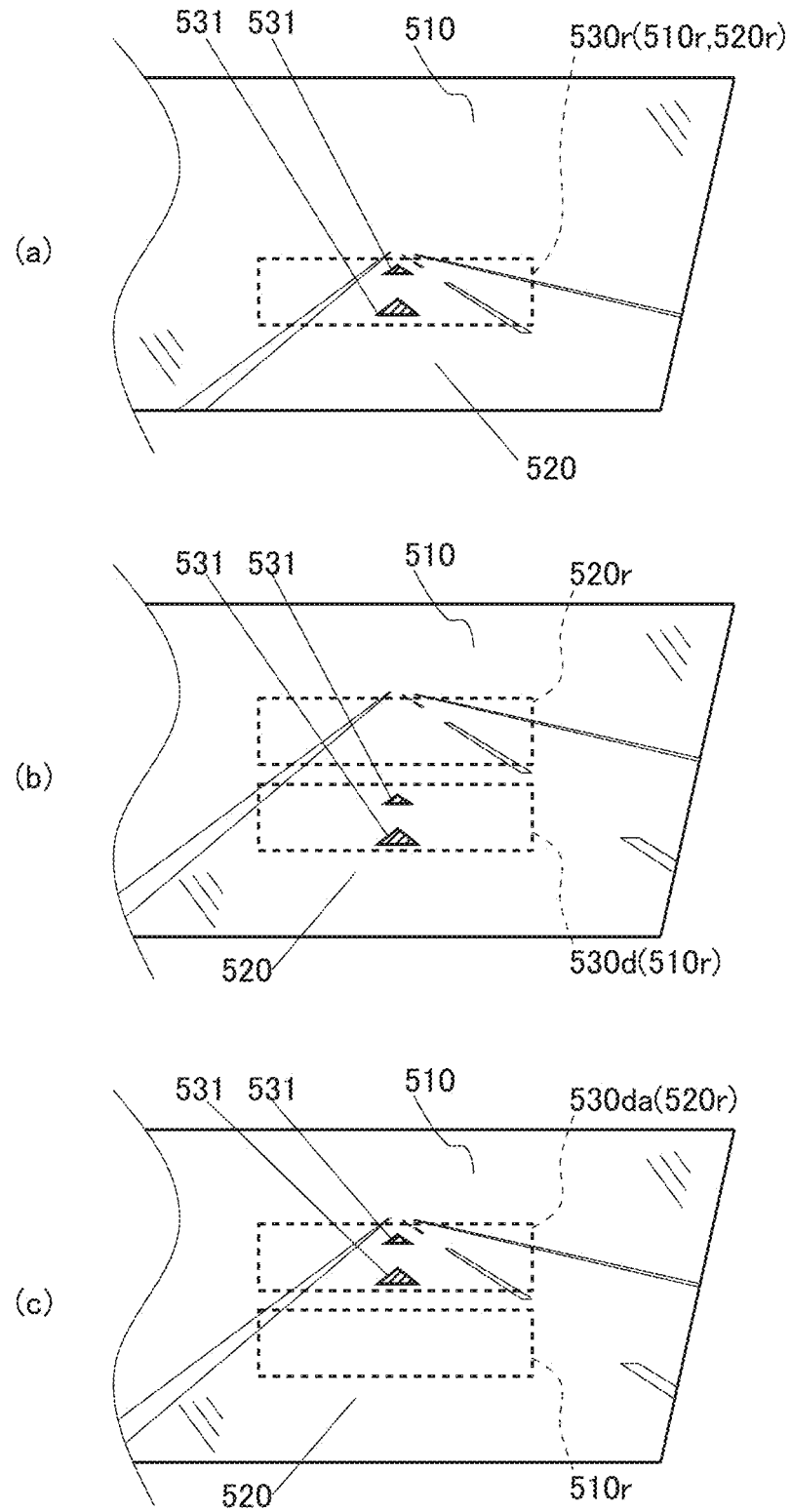

HEAD-UP DISPLAY

CROSS REFERENCE

This application is the U.S. National Phase under 35 U.S.C. § 371 of International Application No. PCT/JP2017/039948, filed on Nov. 6, 2017, which claims the benefit of Japanese Application No. 2016-220434, filed on Nov. 11, 2016, the entire contents of each are hereby incorporated by reference.

TECHNICAL FIELD

The present disclosure relates to a head up display for displaying a virtual image.

BACKGROUND ART

A head-up display generates an augmented reality Augmented Reality (AR), which adds information to an actual scene and emphasizes a specific object in an actual scene by displaying an overlapping virtual image on an actual scene in front of a vehicle, and contributes to safe and comfortable vehicle operation by accurately providing desired information while minimizing movements of a line of sight a viewer driving a vehicle.

The head up display comprises an image display unit having a display surface, and relay optics project a display surface on a windshield (on example of a transmissive reflector) positioned in front of a viewer, so as to generate an imaginary virtual image displayable area corresponding to the display surface on the inside (outside of the vehicle) of the windshield as viewed from the viewer, and the image display unit displays the image on the display surface, so as to display a virtual image of the image on the virtual image displayable area.

For example, the head up display of JP-A-2012-035745 generates the virtual image displayable area in a position overlapping a specific actual scene area seen from the viewer, acquires the actual information in the front of the vehicle by an actual information acquisition unit consisting of a camera having an image sensor, and the image display unit adjusts the position of the image displayed on the display surface based on the actual information so that a virtual image is displayed in the desired position in the specific actual scene area.

PRIOR ART DOCUMENT

Patent Document

Patent Literature 1: Patent JP-A-2012-035745

SUMMARY OF THE INVENTION

Problems to be Solved by the Invention

However, it is remarkably difficult to overlap the virtual image displayable area generated by the head up display and the specific actual scene area, and there was the risk that the viewer feels uncomfortable due to the misalignment between the virtual image displayable area generated by the head up display and the specific actual scene area.

FIG. 10 is a diagram illustrating the actual scene and the virtual image seen by the viewer through the windshield. When a vehicle is traveling normally, the viewer visually recognizes an actual scene 520 through a windshield 510 as shown in FIG. 10(a). The head up display projects the display surface of the image display unit on a specific area 510r on the windshield 510 seen from the viewer, generates a virtual image displayable area 530r corresponding to the display surface in the position overlapping the specific actual scene area 520r in the actual scene 520, and displays a virtual image 531 on the position overlapping the specific actual scene area 520r as viewed from the viewer by displaying the image on the display surface.

However, for example, when the image display unit does not adjust the display position of the image on the display surface in accordance with a downward pitch which occurs when the vehicle brakes suddenly and in which the front of the vehicle faces downward toward the road side, a virtual image displayable area 530d is misaligned from the specific actual scene area 520r as viewed from the viewer as shown in FIG. 10(b). This occurs because, even in a state of a downward pitch in a state when the vehicle is traveling normally, the head up display continues to project the display surface of the image display unit to the specific area 510r on the windshield 510 which is unchanged, and thus, can continue the display in the specific area 510r on the windshield 510, but cannot continue the display in the specific actual scene area 520r.

Further, when the image display unit adjusts the position where the image on the display surface is displayed in accordance with the downward pitch in which the front of the vehicle faces downward toward the road side, as shown in FIG. 10(c), the virtual image displayable area 530d can continue the display in the specific actual scene area 520r which is unchanged, but cannot continue the display in the specific area 510r on the windshield 510. In either case, there was the risk that the viewer gets an impression of a limitation in the area where the virtual image 531 is displayed.

One object of the present disclosure is to provide a head up display without the feeling of a narrowing of the display area.

Solution to Problem

The present disclosure utilizes the following means in order to solve the problems.

The head up display of the present disclosure displays a virtual image on a virtual image displayable area overlapping an actual scene on the outside of the vehicle by projecting a display light on a transmissive reflector, wherein a control unit expands the range of the actual scene in which the virtual image is overlappingly displayed as viewed from the viewer, by enlarging the virtual image display area that defines the range for displaying a virtual image in the virtual image displayable area when a misalignment occurs in the relative position of the transmissive reflector and the actual scene as viewed from the viewer, thus, it is difficult for the viewer to embrace the impression that the range of the actual scene on which the virtual image is displayed is narrowed.

The head up display of a first aspect of the present disclosure is mounted on a vehicle, and displays a first virtual image (V1) on a first virtual image displayable area (310) overlapping an actual scene on the outside of the vehicle by projecting a first display light (210) on a transmissive reflector, and comprises a first image display unit (10) having a first image display surface (13) corresponding to the first virtual image displayable area and emitting a first display light from the first image display surface, relay optics that direct the first display light emitted by the first image display unit to the transmissive reflector, and a control unit (70) for enlarging the virtual image display area (311) that defines the range for displaying the first virtual image in the first virtual image displayable area when a misalignment occurs in the relative position of the transmissive reflector and the actual scene as viewed from the viewer. In the first aspect, when a misalignment occurs in the relative position of the transmissive reflector and the actual scene as viewed from the viewer, it is possible to not feel the narrowness of the display area in which the virtual image is displayed by enlarging the virtual image display area that defines the range for displaying a first virtual image.

In a second aspect, the head up display further comprises a vehicle attitude information acquisition means (73) for acquiring vehicle attitude information (8G) comprising information relating to a vehicle attitude of the vehicle, wherein the control unit may enlarge the virtual image display area based on the vehicle attitude information acquired by the vehicle attitude information acquisition means. In the second aspect, the virtual image display area can be enlarged based on the vehicle attitude.

In a third aspect, the head up display further comprises a viewpoint information acquisition means (73) for acquiring viewpoint information (7G) comprising information relating to a viewpoint position of the viewer, wherein the control unit may enlarge the virtual image display area based on the viewpoint information acquired by the viewpoint information acquisition means. In the third aspect, the virtual image display area can be enlarged based on the viewpoint position of the viewer.

In a fourth aspect, the control unit may increase the amount of the enlargement of the virtual image display area as the amount of relative position misalignment of the transmissive reflector and the actual scene becomes large. In the fourth aspect, the amount of the enlargement of the virtual image display area is adjusted in accordance with the amount of relative position misalignment of the transmissive reflector and the actual scene, thus, by the amount of the enlargement of the virtual image display area being too small, the display area in which the virtual image is displayed feels narrow, or by the amount of the enlargement of the virtual image display area being too large, it is possible to prevent the attention of the viewer from becoming distracted, and the virtual image display area can be suitably enlarged.

In a fifth aspect, the control unit determines the enlargement direction in which the virtual image display area is enlarged in accordance with the direction of the relative position misalignment of the transmissive reflector and the actual scene, or may determine the enlargement direction in which the amount of enlargement becomes larger than the other enlargement direction of the virtual image display area. In the fifth aspect, the enlargement direction in which the virtual image display area is enlarged is determined in accordance with the direction of the relative position misalignment of the transmissive reflector and the actual scene, thus, the virtual image display area can be enlarged only in the necessary direction, and can prevent the virtual image display area from becoming enlarged in an unnecessary direction the attention of the viewer from becoming distracted. Alternatively, in the fifth aspect, the virtual image display area is enlarged more in the necessary direction, and is enlarged less in other directions, thus, while the virtual image is certainly displayed in the necessary direction, the distraction of the attention of the viewer is prevented in the other directions, and information can be provided to the viewer.

In a sixth aspect, the virtual image display area is set in order to overlap in the specific area of the actual scene which is in a fixed positional relationship with the vehicle as viewed from the viewer in a normal state prior to the occurrence of the relative position misalignment of the transmissive reflector and the actual scene, wherein the control unit may enlarge the virtual image display area so as to overlap with at least one part of the specific area of the actual scene as viewed from the viewer when the relative position misalignment of the transmissive reflector and the actual scene occurs. In the sixth aspect, even when the relative position misalignment of the transmissive reflector and the actual scene occurs as viewed from the viewer, it is possible to continue the display of the virtual image in a part of the specific area of the actual scene which is in a fixed positional relationship with the vehicle.

In a seventh aspect, the virtual image display area is set in order to overlap in the specific area of the actual scene which is in a fixed positional relationship with the vehicle as viewed from the viewer in a normal state prior to the occurrence of the relative position misalignment of the transmissive reflector and the actual scene, wherein the control unit may enlarge the virtual image display area so as to overlap with at least the entirety of the specific area of the actual scene as viewed from the viewer when the relative position misalignment of the transmissive reflector and the actual scene occurs. In the seventh aspect, even when the relative position misalignment of the transmissive reflector and the actual scene occurs as viewed from the viewer, it is possible to continue the display of the virtual image, in the entirety of the specific area of the actual scene which is in a fixed positional relationship with the vehicle.

In an eighth aspect, the control unit may reduce the enlarged virtual image display area when the relative position misalignment of the transmissive reflector and the actual scene continued for a predetermined period of time. In the eighth aspect, the distraction of the attention of the viewer which occurs due to the continuing enlargement of the virtual image display area can be suppressed.

In a ninth aspect, the virtual image display area is set in order to overlap in the specific area of the actual scene which is in a fixed positional relationship with the vehicle as viewed from the viewer in a normal state prior to the occurrence of the relative position misalignment of the transmissive reflector and the actual scene, wherein the control unit views the enlarged virtual image display area from the viewer and may reduce the virtual image display area so as to overlap the enlarged virtual image display area with the entirety of the specific area of the actual scene, when the relative position misalignment of the transmissive reflector and the actual scene continued for a predetermined period of time. In the ninth aspect, while suppressing the distraction of the attention of the viewer which occurs due to the continuing enlargement of the virtual image display area, the display of the virtual image can be continued in the entirety of the specific area of the actual scene which is in a fixed positional relationship with the vehicle.

In a tenth aspect, a head up display for displaying a second virtual image (V2) in a second virtual image displayable area (320) arranged in a position in which the distance from the viewer is different from the first virtual image displayable area by projecting a second display light (220) to the transmissive reflector, comprising an angle adjustment unit which can adjust the relative angle between the first virtual image displayable area and the second virtual image displayable area by adjusting the angle in real space of the first virtual image displayable area, wherein the angle adjustment unit may adjust the angle of the first virtual image displayable area in a direction in which the angle change of the first virtual image displayable area relative to the actual scene caused by the relative position misalignment of the transmissive reflector and the actual scene as viewed from the viewer decreases. In the tenth aspect, it is possible to display the first virtual image and the second virtual image in positions at different distances from the viewer, it becomes easy to differentiate between the first virtual image and the second virtual image and a stereoscopic effect can be impressed to the viewer by adjusting the relative angle between the first virtual image displayable area in which the first virtual image is displayed, and the second virtual image displayable area in which the second virtual image is displayed, and furthermore, it is possible to maintain the angle of the first virtual image displayable area or suppress the angle change relative to the actual scene even when the relative position misalignment of the transmissive reflector and the actual scene seen from the viewer occurs.

Effect of the Invention

A display without the feeling of the narrowness of the display area is possible.

BRIEF DESCRIPTION OF THE DRAWINGS

FIG. 1 is a diagram illustrating an example of a first virtual image displayable area and a second virtual image displayable area generated by a head up display of the present disclosure.

FIG. 2 is a diagram illustrating an example of a state in which an actual scene and a virtual image displayed by the head up display shown in FIG. 1 are visually recognized when facing toward the front of the vehicle from a driver's seat.

FIG. 3 is a diagram illustrating an example of the configuration of the head up display shown in FIG. 1.

FIG. 4 is a diagram illustrating an example in which a first image was displayed on a first screen shown in FIG. 2.

FIG. 5 is a diagram illustrating an example of the configuration of the control unit shown in FIG. 2.

FIG. 6 is a flowchart illustrating the operation of the head up display shown in FIG. 2.

FIG. 7 is a diagram illustrating an arrangement between an actual scene and a virtual image display area of the head up display shown in FIG. 1 when the front of the vehicle was visually recognized from the driver's seat.

FIG. 8A is a diagram illustrating an example of an angle formed by the first and the second virtual image displayable areas generated by the head up display shown in FIG. 2 when a pitch angle of a vehicle is substantially parallel to a road surface: (a) shows an example of the pitch angle of a vehicle, (b) shows an example of the angle of a reflector, and (c) shows the arrangement of the first and second virtual image displayable areas.

FIG. 8B is a diagram illustrating an example of an angle formed by the first and the second virtual image displayable areas generated by the head up display shown in FIG. 2 when a pitch angle of a vehicle faces upward in the vertical direction: (a) shows an example of the pitch angle of a vehicle, (b) shows an example of the angle of a reflector, and (c) shows the arrangement of the first and second virtual image displayable area.

FIG. 8C is a diagram illustrating an example of an angle formed by the first and the second virtual image displayable areas generated by head up display shown in FIG. 2 when a pitch angle of a vehicle faces downward in the vertical direction: (a) shows an example of the pitch angle of a vehicle, (b) shows an example of the angle of a reflector, and (c) shows the arrangement of the first and second virtual image displayable area.

FIG. 9 is a diagram illustrating an example of a state in which an actual scene and a virtual image displayed by the modified example of the head up display shown in FIG. 2 are visually recognized when facing toward the front of the vehicle from a driver's seat.

FIG. 10 is a diagram illustrating the positional misalignment between the actual scene according to an attitude of the vehicle and the front windshield (transmissive reflector), and the positional misalignment between the specific area of the actual scene and the virtual image display area caused by the positional misalignment in a conventional head up display.

MODE FOR CARRYING OUT THE INVENTION

The embodiments described below are used to facilitate understanding of the present invention, and those skilled in the art should note that the present invention is not unduly limited by the embodiments described below.

With reference to FIG. 1, an imaginary first virtual image displayable area 310 and second virtual image displayable area 320 generated by the head-up display (hereinafter referred to as HUD) 100 of the present disclosure will be described. In order to facilitate the following explanation, as shown in FIG. 1, in a real space, for example, the left-right direction facing toward the front of the vehicle 1 is defined as a X axis (the right direction is an X axis positive direction), the vertical direction is defined as a Y axis (the upper side in the vertical direction is a Y axis positive direction), and the front-rear direction is defined as a Z axis (the rear direction is a Z axis positive direction).

As shown in FIG. 1, for example, the HUD 100 is housed in a dashboard 3 of a vehicle (one application example of a moving body). For example, the HUD 100 projects a display light 200 (first display light 210 and second display light 220) indicating vehicle information and the like onto a part of the front windshield (a part of the transmissive reflector) 2 of the vehicle 1. The front windshield 2 generates a predetermined eye box (not illustrated) by reflecting the first display light 210 and the second display light 220 toward a viewer side. The viewer can visually recognize a first virtual image V1 and a second virtual image V2 on the first virtual image displayable area 310 and the second virtual image displayable area 320 virtually generated by the HUD 100 in the front through the front windshield 2 by arranging the viewpoint (the position of the viewer's eye) 4 in the eye box.

If a line connecting the center of the first virtual image displayable area 310 and the viewpoint 4 is a line of sight axis 4a, the first virtual image displayable area 310 shown in FIG. 1 is provided so that an angle 310a formed by the line of sight axis 4a and the display area on the viewer side from the center of first virtual image displayable area 310 is an acute angle, and displays the first virtual image V1 visually recognized superimposed over a predetermined range of the road surface 5W (positions 5a to 5b in FIG. 1) which is an information-imparting object in the actual scene 5. Specifically, for example, the first virtual image displayable area 310 is parallel to the road surface 5W (the horizontal direction consisting of X-Z plane) in FIG. 1 and overlapped over a position 5a which is 10 m away from the eye box in a forward direction (a traveling direction of the vehicle 1) to a position 5b which is 100 m away from position 5a. Note that, the first virtual image displayable area 310 may be provided inclined by about −10 degrees (CCW direction in FIG. 1) to +45 degrees (CW direction in FIG. 1) from an angle parallel to the road surface 5W in FIG. 1.

Further, if a line connecting the center of the second virtual image displayable area 320 and the viewpoint 4 is a line of sight axis 4b, the second virtual image displayable area 320 shown in FIG. 1, for example, is provided so that the angle 320a formed by the display area on the lower side in the vertical direction from the center of the second virtual image displayable area 320 and the line of sight axis 4b is larger than the angle 310a formed by the first virtual image displayable area 310 and the line of sight axis 4a, and displays the second virtual image V2. Specifically, for example, the second virtual image displayable area 320 is substantially parallel to the direction (XY plane) vertical to the traveling direction of the vehicle 1 in FIG. 1, and is visually recognized at a position 5 m to 10 m away from the eye box in a forward direction (a traveling direction of the vehicle 1). Note that, the second virtual image displayable area 320 may be provided inclined by about ±10 degrees from an angle parallel to a direction (X-Y plane) vertical to the traveling direction of the vehicle 1 in FIG. 1.

FIG. 2 is a diagram illustrating an example of the actual scene, the first virtual image V1 and the second virtual image V2 seen from the viewer seated in the driver's seat of the vehicle 1 provided with the HUD 100 shown in FIG. 1. The HUD 100 generates, for example, a first rectangular-shaped virtual image displayable area 310 which is an area capable of displaying the first virtual image V1 as viewed from the viewer, and a second rectangular-virtual image displayable area 320 which is an area capable of displaying the second virtual image V2 and overlapped with the first virtual image displayable area 310. Note that, the first virtual image displayable area 310, the second virtual image displayable area 320 themselves are in a state which is not visually recognized by the viewer or difficult for the viewer to see, and the first virtual image V1 displayed on the first virtual image displayable area 310 and the second virtual image V2 displayed on the second virtual image displayable area 320 are visually recognized by the viewer. The first virtual image V1 displayed in the first virtual image displayable area 310 is displayed in a position close to or overlapping the information-imparting object 5W in the actual scene 5, is an image which emphasizes the information-imparting object 5W, and adds information, for example, an arrow image which adds to a road surface (the information-imparting object) 5W, the information for guiding the route until the destination, and a linear image which emphasizes the white lines (the information-imparting object) 5W during a Lane Departure Warning (LDW). The information-imparting object 5W is, for example, the road surface, obstacles present in the vicinity on the road surface, traffic signs, traffic marks, traffic signals, buildings, and the like. The second virtual image V2 displayed on the second virtual image displayable area 320 does not emphasize a specific object (the information-imparting object 5W) of the actual scene 5, but, for example, is the vehicle information such as the speed of the vehicle 1 or information indicating the distance to a junction.

The first virtual image displayable area 310 is, normally, constituted from a virtual image display area 311 which is an area for displaying the first virtual image V1, and a virtual image blank area 312 surrounding the virtual image display area 311 at least from the vertical direction (Y-axis direction). The virtual image display area 311 overlaps the specific area 5r of the actual scene 5 which is in a fixed positional relationship with the vehicle 1 as viewed from the viewer through the area 2r of the front windshield 2. Namely, normally, the HUD 100 displays the first virtual image V1 on the information-imparting object 5W within the specific area 5r of the actual scene 5 as seen from the viewer, overlaps on the virtual image blank area 312, and does not display the first virtual image V1 on the information-imparting object 5W which is outside of the specific area 5r of the actual scene 5. However, the information which does not emphasize a specific object (the information-imparting object 5W) of the actual scene 5 such as that which is displayed in the second virtual image displayable area 320 may also be displayed as a virtual image even in the virtual image blank area 312. Furthermore, an image for emphasizing the information-imparting object 5W and adding information may also be displayed as the first virtual image V1 for the information-imparting object 5W present in the actual scene 5 overlapping the virtual image blank area 312 as viewed from the viewer, when the urgency is high or the importance is high. Hereinafter, the area 2r of the front windshield 2 where the virtual image display area 311 normally appears is referred to as the reference projecting area 2r, and the specific area 5r of the actual scene 5 where the virtual image display area 311 normally overlaps is referred to as the reference actual scene area 5r. The HUD 100 of the present disclosure executes the enlargement process which enlarges the virtual image display area 311 which is the range for displaying the first virtual image V1 when the positional misalignment occurred in the reference projecting area 2r seen from the viewer and the reference actual scene area 5r. This enlargement process will be described later.

Returning to FIG. 2, each type of detector provided in the vehicle 1 will be described. Note that, each type of detector described herein may be provided in the HUD 100. Further, the detector may be detachably wired or wirelessly connected to the vehicle 1 or the HUD 100. Specifically, a sensor unit may be wired or wirelessly connected to the vehicle 1 or the HUD 100, and a mobile terminal having each type of detector may be wired or wirelessly connected.

The actual information detector 6 for acquiring the actual information 6F of the vehicle 1 is mounted on the vehicle 1 of FIG. 1. The actual information 6F includes at least the position information of the information-imparting object 5W that is emphasized by displaying with the first virtual image V1 or loaded with the information of the actual scene 5 at the front of the vehicle 1, and is acquired, for example, from one or a plurality of cameras, infrared sensors, GPS and a navigation system having an electronic compass. The information-imparting object 5W is, for example, the road surface, obstacles present in the vicinity on the road surface, traffic signs, traffic marks, traffic signals, and buildings.

Further, a viewpoint information detector (the position misalignment information acquisition means) 7 for acquiring the viewpoint information 7G of the viewer of the HUD 100 is housed in the vehicle 1 of FIG. 1. The viewpoint information 7G (the position misalignment information G to be described later) comprises at least the position information of the vertical direction (Y-axis direction) of the viewpoint of the viewer, and may include the position information of the left-right direction (X-axis direction) and the depth direction (Z-axis direction), obtained from, for example, a camera, an infrared camera and the like.

A vehicle attitude detector (the position misalignment information acquisition means) 6 that detects an attitude of the vehicle 1 is mounted on the vehicle 1 in FIG. 1. The vehicle attitude detector 8 estimates a pitch angle (vehicle attitude) of a vehicle 1 relative to a horizontal plane, for example, by analyzing a triaxle acceleration sensor (not illustrated) and a triaxle acceleration detected by the triaxle acceleration sensor, and outputs vehicle attitude information 8G (the position misalignment information G to be described later) including information relating to the pitch angle of the vehicle 1 to the HUD 100 (control unit 70). Note that, other than the triaxle acceleration sensor described above, the vehicle attitude detector 8 may be constituted by a height sensor (not illustrated) arranged in the vicinity of a suspension of the vehicle 1. At this time, the vehicle attitude detector 8 estimates the pitch angle of the vehicle 1 as described above by analyzing the height of the vehicle 1 from the ground detected by the height sensor, and outputs the vehicle attitude information 8G including the information relating to the pitch angle of the vehicle 1 to the HUD 100 (control unit 70). Further, the vehicle attitude detector 8 may be constituted from an imaging camera (not illustrated) for imaging the outside of the vehicle 1 and an image analysis unit (not illustrated) for analyzing the captured image. At this time, the vehicle attitude detector 8 estimates a pitch angle (vehicle attitude) of the vehicle 1 from a time change of the actual scene included in the captured image. Note that, the method by which the vehicle attitude detector 8 obtains the pitch angle of the vehicle 1 is not limited to the above-described method, and the pitch angle of the vehicle 1 may be obtained using a known sensor or analysis method.

FIG. 3 is a diagram illustrating an example of a configuration of the HUD 100 shown in FIG. 1.

The HUD 100 of FIG. 1 comprises, for example, a first image display unit 10, a second image display unit 20, a reflector 30, an actuator 40, a display synthesizer 50, a concave mirror 60, and a control unit 70. Generally, the HUD 100 is housed in a dashboard of the vehicle 1, but some or all of the first image display unit 10, the second image display unit 20, the reflector 30, the actuator 40, the display synthesizer 50, the concave mirror 60 and the control unit 70 may be arranged outside the dashboard. The HUD 100 (control unit 70) is connected to a bus 9 comprising a vehicle-mounted Local Area Network (LAN) or the like mounted on the vehicle 1, and the actual information 6F, the viewpoint information 7G or the vehicle attitude information 8G can be inputted from the bus 9.

The first image display unit 10 of FIG. 3 is mainly constituted from, for example, a first projection unit 11 composed of a projector or the like using a reflective display device such as a DMD and LCoS, and a first screen 12 which receives projection light from the first projection unit 11 to display a first image 14, and emits the first display light 210 indicating the first image 14 toward the reflector 30. The first image display unit 10 displays the first image 14 on a first screen 12 based on image data D input from the control unit 70 to be described later, to thereby display the first virtual image V1 on the first virtual image displayable area 310 virtually generated in front of a viewer.

FIG. 4 is a front elevation view of first screen 12 shown in FIG. 3. In order to facilitate understanding of the following explanation, as shown in FIG. 4, the left-right direction of the first screen 12 is defined as the dx axis (the left direction is a dx axis positive direction), and the vertical direction of the first screen 12 is defined as the dy axis (the downward direction is a dy axis positive direction). The position in the X axis direction of the first virtual image V1 visually recognized by the viewer from a driver's seat of the vehicle 1 shown in FIG. 2 corresponds to the position in the dx axis direction of the first image 14 displayed on the first screen 12 shown in FIG. 4. Similarly, the position in the Y-axis direction of the first virtual image V1 visually recognized by the viewer from a driver's seat of the vehicle 1 shown in FIG. 2 corresponds to the position in the dy axis direction of the first image 14 displayed on the first screen 12 shown in FIG. 4. Note that, depending on the arrangement such as of the optical members (the first image display unit 10, the second image display unit 20, the reflector 30, actuator 40, the display synthesizer 50 and the concave mirror 60) in the HUD 100, the relationship between the above mentioned XY coordinate axes in a real space and the dxdy coordinate axes used in the explanation of the first screen 12 is not limited to the above.

The first screen 12 of FIG. 3 has an area 13 capable of displaying the first image 14 as shown in FIG. 4. The area 13 of the first screen 12 capable of displaying the first image 14 is referred to, for example, as a first image display surface 13. The first virtual image displayable area 310 corresponds to the first image display surface 13 of the first image display unit 10, and the size of the first virtual image displayable area 310 and the position in a real space where the first virtual image displayable area 310 is generated can be adjusted according to the size of the first image display surface 13 on the first screen 12 and the position of the first image display surface 13 on the first screen 12. Note that, if the line connecting the center of the first image display surface 13 of the first screen 12 and the viewpoint 4 is the line of sight axis 4a, for example, the surface of first screen 12 is arranged to be inclined at a predetermined angle with respect to the line of sight axis 4a.

The first image display surface 13 comprises an image display area 13a and an image blank area 13b having an area in the periphery of the image display area 13a including at least the vertical direction (dy direction) of the image display area 13a. The first image display unit 10 of the present embodiment normally displays the first image 14 in the image display area 13a, and also displays the first image 14 in the image blank area 13b when the enlargement process to be described later is executed.

A second image display unit 20 of FIG. 3 has a similar configuration as the above described first image display unit 10, is constituted from a second projection unit 21 and a second screen 22 having a second image display surface 23, and displays a second image 24 on the second image display surface 23. A description of these configurations has been omitted. Note that, if the line connecting the center of the second image display surface 23 of the second screen 22 and the viewpoint 4 is the line of sight axis 4b, for example, the surface of the second screen 22 is arranged to be inclined at a predetermined angle with respect to the line of sight axis 4b.

The reflector (relay optics) 30 of FIG. 3 is formed, for example, of a flat plane mirror and arranged to be inclined on the optical route of the first display light 210 directed from the first image display unit 10 to the viewpoint 4, and reflects the first display light 210 emitted from the first image display unit 10 toward the display synthesizer 50. The reflector 30 is provided with the actuator 40 for rotating the reflector 30. Note that, the reflector 30 may have a curved surface, not a flat surface.

The actuator 40 is, for example, a stepping motor, a DC motor, or the like, and rotates the reflector 30 based on the viewpoint information 7G detected by the viewpoint information detector 7 and/or the vehicle attitude information 8G detected by the vehicle attitude detector 8 under the control of a control unit 70 to be described later, and so as to thereby adjust the angle and position of the first virtual image displayable area 310.

The display synthesizer (relay optics) 50 of FIG. 3 is constituted by, for example, a flat half mirror which formed a semi-transmissive reflection layer such as a metal reflection film or a dielectric multilayer film on one surface of a translucent substrate. The display synthesizer 50 reflects the first display light 210 reflected by the reflector 30 from the first image display unit 10 toward the concave mirror 60, and transmits the second display light 220 from the second image display unit 20 to the concave mirror 60. The transmittance of the display synthesizer 50 is, for example, 50%, and may be appropriately adjusted to adjust the luminance of the first virtual image V1 and the second virtual image V2.

The concave mirror 60 of FIG. 3 is arranged, for example, to be inclined on the optical route of the first display light 210 and the second display light 220 from the first image display unit 10 and the second image display unit 20 toward the viewpoint 4, and reflects the first display light 210 and the second display light 220 emitted from the first image display unit 10 and the second image display unit 20 toward the front windshield 2. The optical route length of the first display light 210 from the first screen 12 of the first image display unit 10 to the concave mirror 60 is arranged so as to be longer than the optical route length of the second display light 220 from the second screen 22 of the second image display unit 20 to the concave mirror 60. As a result, the first virtual image V1 generated by the first image display unit 10 is formed at a position farther from the eye box than the second virtual image V2 generated by the second image display unit 20. Note that, the concave mirror 60, typically has a function for enlarging the first display light 210 and the second display light 220 generated by the first image display unit 10 and the second image display unit 20 in cooperation with the front windshield (transmissive reflector) 2, a function for correcting distortions of the first virtual image V1 and the second virtual image V2 caused by the curved surface of the front windshield 2 and visually recognizing the virtual image without distortions, and a function for forming the first virtual image V1 and the second virtual image V2 at a position away from a viewer at a predetermined distance.

FIG. 5 shows a schematic configuration example of the control unit 70 of FIG. 3. As shown in FIG. 5, the control unit 70 includes, for example, a processing unit 71, a storage unit 72 and an interface 73. The processing unit 71 is constituted by, for example, a CPU and a RAM, the storage unit 72 is constituted by, for example, a ROM, the interface 73 is constituted by an input/output communication interface connected to a bus 9. For example, the interface 73 can acquire vehicle information the actual information 6F, the viewpoint information 7G, the vehicle attitude information 8G and the like to be described later via the bus 7. The storage unit 72 can store data for generating image data D based on the inputted vehicle information, the actual information 6F, the viewpoint information 7G and the vehicle attitude information 8G, and data for generating drive data T based on the inputted viewpoint information 7G and the vehicle attitude information 8G. The processing unit 71 can read data from the storage unit 72 and generate the image data D and the drive data T by executing a predetermined operation. Note that, the interface 73 can acquire, for example, the viewpoint information 7G (the position misalignment information G to be described later) containing the information relating to the position of the viewpoint of the viewer from the viewpoint information detector 7 via the bus 9, can acquire vehicle attitude information 8G (the position misalignment information G to be described later) including the information relating to the attitude of the vehicle 1 from the vehicle attitude detector 8, and has a function as a viewpoint information acquisition means, a vehicle attitude information acquisition means, and a position misalignment information acquisition means. Note that, the control unit 70 may be provided inside the HUD 100, and some or all of its functions may be provided on the vehicle 1 side outside the HUD 100.

The position misalignment information G will be described. The position misalignment information G is information which can estimate whether the positional misalignment occurs in the reference projecting area 2r of the front windshield 2 and the reference actual scene area 5r of the actual scene 5 as viewed from the viewer, and specifically, for example, as stated above, is the viewpoint information 7G relating to the viewpoint position of the viewer of the HUD 100 detected by the viewpoint information detector 7, and vehicle attitude information 8G containing information relating to the pitch angle of the vehicle 1 detected by the vehicle attitude detector 8. When the viewpoint of the viewer the position shifts in the vertical direction, the actual scene 5 visually recognized by the viewer through the reference projecting area 2r of the front windshield 2 is an area different than the reference actual scene area 5r, and it can be estimated by the viewpoint information 7G showing the viewpoint position of the viewer whether or not the positional misalignment occurs in the reference projecting area 2r of the front windshield 2 and the reference actual scene area 5r of the actual scene 5 seen by the viewer. Further, when the pitch angle was changed from parallel relative to the road surface of the vehicle 1, the actual scene 5 visually recognized by the viewer through the reference projecting area 2r of the front windshield 2 is a different area than the reference actual scene area 5r, and it can be estimated by the vehicle attitude information 8G containing the information relating to the pitch angle of the vehicle 1 whether or not misalignment occurs in the reference projecting area 2r of the front windshield 2 and the reference actual scene area 5r of the actual scene 5 seen by the viewer. The first image display unit 10 executes the enlargement process which enlarges the virtual image display area 311 displaying the first virtual image V1 based on the position misalignment information G. An operational example of the HUD 100 of the present embodiment will be described below. Note that, the position misalignment information G may use information obtained using techniques known prior to this application other than the viewpoint information 7G and the vehicle attitude information 8G described in the present embodiment.

FIG. 6 is a flowchart showing an example of the operation of the HUD 100 of the present embodiment. The HUD 100 starts the processing described below, for example, when the vehicle 1 is activated, or, when electric power is supplied to the electronic device of the vehicle 1, or, when a predetermined period of time has elapsed after the activation of the vehicle 1 or the power supply to the electronic device of the vehicle 1.

In Step S1, the processing unit 71 acquires the position misalignment information G (the viewpoint information 7G and the vehicle attitude information 8G) from the interface 73.

In Step S2, the processing unit 71 determines whether a misalignment (positional misalignment) occurred in the relative position of the actual scene 5 and the front windshield (transmissive reflector) 2 based on the position misalignment information G acquired in Step S1. In other words, the processing unit 71 determines whether the actual scene 5 is the specific area 5r through the reference projecting area 2r of the front windshield 2 seen from the viewer. The processing unit 71 does not shift to the enlargement process S3 when it was determined that the positional misalignment did not occur (No in Step S2) based on the position misalignment information G, and returns to Step S1, and moves to the enlargement process S3 when it was determined that the positional misalignment occurred (YES in Step S2).

(Enlargement Process)

In Step S3a of the enlargement process S3, the processing unit 71 sets the amount of enlargement of the virtual image display area 311 in accordance with the position misalignment information G. Specifically, processing unit 71 sets the amount of enlargement of the virtual image display area 311 in accordance with the amount of shift of the viewpoint of the viewer with reference to a predetermined viewpoint position based on the viewpoint information 7G, and when the amount of shift of the viewpoint of the viewer with reference to a predetermined viewpoint position is large, also sets the amount of enlargement of the virtual image display area 311 to be larger. Further, the processing unit 71 sets the amount of enlargement of the virtual image display area 311 in accordance with the size of the pitch angle of the vehicle 1 with reference to the road surface 5W based on the vehicle attitude information 8G, and when the pitch angle of the vehicle 1 is large, also sets the amount of enlargement of the virtual image display area 311 to be large. Note that, the processing unit 71 sets the amount of enlargement of the virtual image display area 311 so as to overlap at least one part of the reference actual scene area 5r of the actual scene 5 seen from the viewer, but preferably, the amount of enlargement of the virtual image display area 311 may be set so as to overlap the entirety of the reference actual scene area 5r of the actual scene 5.

Further, in Step S3a of the enlargement process S3, the processing unit 71 preferably sets the enlargement direction of the virtual image display area 311 in accordance with the position misalignment information G. Specifically, the processing unit 71 enlarges the virtual image display area 311 upwards (Y axis positive direction) as viewed from the viewer when the viewpoint of the viewer was shifted upwards (Y axis positive direction) with reference to a predetermined viewpoint position, and enlarges the virtual image display area 311 downwards (Y axis negative direction) as viewed from the viewer when the viewpoint of the viewer was shifted downwards (Y axis negative direction) based on the viewpoint information 7G. Further, the processing unit 71 enlarges the virtual image display area 311 upwards (Y axis positive direction) as viewed from the viewer vehicle 1 when the viewpoint of the viewer was shifted upwards (Y axis positive direction) with reference to the predetermined viewpoint position of the down-pitched vehicle 1, and enlarges the virtual image display area 311 downwards (Y axis negative direction) as viewed from the viewer when the viewpoint of the viewer was shifted downwards (Y axis negative direction) based on the vehicle attitude information 8G.

In Step S3b, the processing unit 71 updates the display of the first image display unit 10 and enlarges the virtual image display area 311 on the first image display surface 13, so that the virtual image display area 311 which displays the first virtual image V1 on the first virtual image displayable area 310 is enlarged.

In Step S4, the processing unit 71 determines whether the positional misalignment detected in Step S2 is continuing, or based on the newly acquired position misalignment information G. The processing unit 71 proceeds to Step S6, reduces the virtual image display area 311 to the original size and updates the display (Step S7) when it was determined that the positional misalignment detected in Step S2 is not continuing (No in Step S4).

The processing unit 71 determines the duration of the positional misalignment in Step S5 when the positional misalignment detected in Step S2 was determined to be continuing (YES in Step S4), and, proceeds to Step S6, reduces the virtual image display area 311 and updates the display (Step S7) when the positional misalignment continues for a predetermined period of time (for example, 3 minutes) or longer. Note that, in this case, the reduced virtual image display area 311 is reduced so as to overlap with the reference actual scene area 5r as viewed from the viewer.

FIG. 7 is a diagram illustrating the positional relationship of the actual scene 5, the first virtual image displayable area 310 and the virtual image display area 311 seen from the viewer seated in the driver's seat of the vehicle 1 provided with the HUD 100 shown in FIG. 1. FIG. 7(a) shows the normal state, and virtual image display area 311 overlaps the specific area 5r of the actual scene 5 which is visually recognized through the area 2r of the front windshield 2 as viewed from the viewer, and displays the first virtual image V1 on the information-imparting object 5W which is in the virtual image display area 311 of the actual scene 5.

FIG. 7(b) is a state in which the vehicle 1 is pitched down, shows a state in which the HUD 100 executes the enlargement process, the solid hatched area is the reference actual scene area 5r, the dotted hatched area is the reference projecting area 2r, and the filled area is the enlarged virtual image display area 311d. When the vehicle 1 is pitched down, the reference projecting area 2r of the front windshield 2 which overlaps with the reference actual scene area 5r in the normal state as viewed from the viewer shifts downward from the reference actual scene area 5r of the actual scene 5. The HUD 100 executes the aforementioned enlargement process S3 so as to make the virtual image display area 311 which is the area displaying the first virtual image V1 as the virtual image display area 311d enlarged on the upper side as viewed from the viewer. Therefore, it is possible to continue displaying the first virtual image V1 with respect to the actual scene 5 through the reference projecting area 2r on the front windshield 2 on which the first virtual image V1 was displayed in the normal state, and, it is possible to continue displaying the first virtual image V1 with respect to the reference actual scene area 5r which is in a fixed positional relationship with the vehicle 1, thus, the first virtual image V1 is suddenly not displayed in the reference actual scene area 5r on the actual scene 5, it is possible to prevent the first virtual image V1 from being displayed on the reference projecting area 2r on the front windshield 2, and the viewer does not feel the narrowness of the area (virtual image display area 311) on which the first virtual image V1 is displayed.

When the control unit 70 acquired the position misalignment information G, and determined that the enlargement process is necessary, the first virtual image V1 is directly displayed on the information-imparting object 5W of the actual scene 5 overlapping in the enlarged virtual image display area 311d seen from the viewer. Therefore, even when positional misalignment occurs in the front windshield 2 and the actual scene 5 seen from the viewer, it is possible to directly display in the enlarged virtual image display area 311d, and it is possible to quickly communicate the information to the viewer.

However, when the control unit 70 acquired the position misalignment information G, and determined that the enlargement process is necessary, the visibility (luminance, brightness, saturation) of the first virtual image V1 newly displayed in the area to be enlarged (the area to be increased) when enlarging from the virtual image display area 311 prior to being enlarged to the virtual image display area 311*d* may gradually increase over time. Therefore, it is possible to suppress the confusion of the viewer caused by the instantaneous increase of the first virtual image V1 to be displayed.

FIG. 7 (*c*) shows the state in which the virtual image display area 311 was reduced in Steps S6 and S7 after the position misalignment was continued for a predetermined time in the aforementioned Step S5, the solid hatched area is the reference actual scene area 5*r*, the dotted hatched area is the reference projecting area 2*r*, and the filled area is the virtual image display area 311*dx* reduced in Steps S6 and S7. When the enlargement process as shown in FIG. 7 (*b*) continued for a predetermined time or longer, the processing unit 71 gradually reduces the virtual image display area 311*d* over time so as to overlap in the reference actual scene area 5*r* of the actual scene 5. Therefore, even after performing the enlargement process, the display can be continued in the reference actual scene area 5*r* which is in a fixed positional relationship with the vehicle 1, and the area (virtual image display area 311) displayed by the first virtual image V1 is reduced, thus, the viewer can be kept from becoming distracted.

Note that, in first virtual image displayable area 310, the angle with respect to the actual scene (road surface) 5 is changed in accordance with the position (the height) of the viewpoint of the viewer and the pitch angle of the vehicle 1. The processing unit 71 of the present embodiment can reduce and mitigate an unintentional angle change in the actual scene 5 of the first virtual image displayable area 310 by adjusting the angle of the first virtual image displayable area 310 in accordance with the viewpoint information 7G and the vehicle attitude information 8G to be acquired. The method is described below.

The control unit 70 determines the drive data T including the drive amount of the actuator 40 corresponding to the acquired viewpoint information 7G and/or vehicle attitude information 8G. Specifically, the control unit 70 reads out the table data stored in advance in the storage unit 72, and determines the drive data T corresponding to the acquired viewpoint information 7G and/or vehicle attitude information 8G. Note that, the control unit 70 may acquire the drive data T from the viewpoint information 7G and/or vehicle attitude information 8G by a calculation using a preset calculation formula.

Next, the control unit 70 drives the actuator 40 based on the determined drive data. The control unit 70 drives the actuator 40 and rotates the reflector 30 positioned on the optical route of the first display light 210 emitted by the first image display unit 10. Note that, the angle of the second virtual image displayable area 320 is not adjusted, thus, the relative angle 330 of the first image display unit 10 is changed with respect to the second virtual image displayable area 320. Specifically, for example, the control unit 70 may control the actuator 40 and rotate the reflector 30 so that the first virtual image displayable area 310 is parallel to the road surface in the actual scene 5 even when the position (the height) of the viewpoint of the viewer changes or when the vehicle attitude of the vehicle 1 changes.

FIG. 8A, FIG. 8B, FIG. 8C are drawings showing changes of the angle 330 formed by the first virtual image displayable area 310 and the second virtual image displayable area 320 generated by the HUD 100 of the present embodiment. (a) in FIG. 8A, FIG. 8B and FIG. 8C are drawings showing a pitch angle (vehicle attitude) as to what extent the pitch angle of the vehicle 1 is inclined with respect to the road surface 5W consisting of the XZ plane, (b) is a diagram illustrating how the reflector 30 is rotated based on the vehicle attitude shown in (a), and (c) is a diagram illustrating the angle 330 formed between the first virtual image displayable area 310 and the second virtual image displayable area 320 based on the vehicle attitude shown in (a).

FIG. 8A is a diagram showing the angle 330 formed by the first virtual image displayable area 310 and the second virtual image displayable area 320 in the case of a vehicle attitude 1*r* where the vehicle 1 is parallel to the road surface 5W. As shown in (a) of FIG. 8A, in the case of a vehicle attitude 1*r* where the vehicle 1 is parallel to the road surface 5W, for example, the reflector 30 is made to be an angle 30*r* shown in (b) of FIG. 8A based on the drive data T determined in Step S02 shown in FIG. 6, the first virtual image displayable area 310 is, for example, adjusted to be substantially parallel to the road surface 5W as shown in (c) of FIG. 8A, and the angle 330 formed by the first virtual image displayable area 310 and the second virtual image displayable area 320 is an angle 330*r* that is substantially 90 degrees. A vehicle attitude 1*r* where the vehicle 1 shown in (a) of FIG. 8A is parallel to the road surface 5W is also referred to as a reference vehicle attitude 1*r* as below. Further, an angle 30*r* of the reflector 30 shown in (b) of FIG. 8A is also referred to as a reference angle 30*r*. Further, the angle 330*r* formed by the first virtual image displayable area 310 and the second virtual image displayable area 320 as shown in (c) of FIG. 8A is also referred to as a reference angle 330*r* as below.

FIG. 8B is a diagram illustrating the angle 330 formed by the first virtual image displayable area 310 and the second virtual image displayable area 320 when the front of the vehicle 1 is inclined upward in the vertical direction. As shown in (a) of FIG. 8B, in the case of a vehicle attitude 1*u* where the front of the vehicle 1 is inclined further upward in the vertical direction than the reference vehicle attitude 1*r*, for example, the reflector 30 is made to be an angle 30*u*, rotated clockwise (CW direction) with respect to the reference angle 30*r* as shown in (b) of FIG. 8B based on the drive data T determined in Step S02 shown in FIG. 6, the first virtual image displayable area 310 is, for example, adjusted so as to be substantially parallel to the road surface 5W as shown in (c) of FIG. 8B, and the angle 330 formed by the first virtual image displayable area 310 and the second virtual image displayable area 320 is an angle 330*u* larger than the reference angle 330*r*.

FIG. 8C is a diagram illustrating the angle 330 formed by the first virtual image displayable area 310 and the second virtual image displayable area 320 when the front of the vehicle 1 is inclined downward in the vertical direction. As shown in (a) of FIG. 8C, in the case of a vehicle attitude 1*d* where the front of the vehicle 1 is inclined further downward in the vertical direction than the reference vehicle attitude 1*r*, for example, the reflector 30 is made to be an angle 30*d* rotated counterclockwise (CCW direction) with respect to the reference angle 30*r* as shown in (b) of FIG. 8C based on the drive data T determined in Step S02 shown in FIG. 6, the first virtual image displayable area 310 is, for example, adjusted so as to be substantially parallel to the road surface 5W as shown in FIG. 8C(c), and an angle 330 formed by the first virtual image displayable area 310 and the second virtual image displayable area 320 is an angle 330*d* smaller than the reference angle 330*r*.

Here, with reference to FIG. 8A(c), FIG. 8B(c) and FIG. 8C(c), the angle 330 formed by the first virtual image displayable area 310 and the second virtual image displayable area 320 changes according to the attitude of the vehicle 1. As in the examples shown in FIG. 8A, FIG. 8B and FIG. 8C, for example, the front of the vehicle 1 moves upward in the vertical direction, as the angle 330 formed by the first virtual image displayable area 310 and the second virtual image displayable area 320 becomes larger. On the other hand, for example, the front of the vehicle 1 moves downward in the vertical direction, as the angle 330 formed by the first virtual image displayable area 310 and the second virtual image displayable area 320 becomes larger.

As a result, since the angle 330 formed by the first virtual image displayable area 310 and the second virtual image displayable area 320 changes based on the vehicle attitude of the vehicle 1, the viewer can recognize which of the virtual images to be visually recognized is the information displayed on the first virtual image displayable area 310 or the second virtual image displayable area 320, and then, it is possible to recognize more stereoscopically the first virtual image V1 and the second virtual image V2 respectively displayed on the first virtual image displayable area 310 and the second virtual image displayable area 320.

Further, in the HUD 100 of the present embodiment, the first virtual image displayable area 310 is generated inclined in the horizontal direction from the second virtual image displayable area 320, and an angle with respect to an actual scene is adjusted by driving the actuator 40. The angle adjustment of the virtual image displayable area (first virtual image displayable area 310) inclined in the horizontal direction with respect to the actual scene provides a larger impression to the viewer for a fixed angle change of the virtual image displayable area than the angle adjustment of the virtual image displayable area (first virtual image displayable area 310) inclined in the vertical direction with respect to the actual scene. Therefore, by adjusting the angle of the virtual image displayable area (the first virtual image displayable area 310) inclined in the horizontal direction, it becomes easy to distinguish between the first virtual image V1 displayed on the first virtual image displayable area 310 and the second virtual image V2 displayed on the second virtual image displayable area 320, and as a result, it is possible to recognize more stereoscopically the first virtual image V1 and the second virtual image V2 displayed respectively on the first virtual image displayable area 310 and the second virtual image displayable area 320.

Hereinafter, modifications of the embodiment of the present invention will be described. In the above description, the actuator 40 rotates the reflector 30 positioned on the optical route of the first display light 210 up to the display synthesizer 50 which directs the first display light 210 and the second display light 220 in the same direction, to thereby change the angle 330 formed by the first virtual image displayable area 310 and the second virtual image displayable area 320. However, the display synthesizer 50 may be rotated by the actuator 40. In this case, in the same manner as the abovementioned case when the actuator 40 rotates the reflector 30, it is possible to adjust only the angle of the first virtual image displayable area 310 with respect to the actual scene without adjusting the angle of the second virtual image displayable area 320.

Further, in the HUD 100 of the present disclosure, the angle 330 formed by the first virtual image displayable area 310 and the second virtual image displayable area 320 may be changed by rotating the display surface (the first screen 12) of the first image display unit 10 with the actuator 40. Note that, in the actuator 40, it is not necessary that the rotation axis AX is in the center of the reflector 30, the display synthesizer 50, and the display surface (first screen 12) of the first image display unit 10, and the rotation axis AX may be at a predetermined position of the respective optical members (including an end portion). Further, the rotation axis AX may be provided at a position away from the respective optical members.

FIG. 10 is a drawing which shows an example in which a first virtual image V1 and a second virtual image V2 displayed by a modified example of the HUD 100 shown in FIG. 2 were visually recognized, when facing toward the front of the vehicle 1 from the driver's seat. As shown in FIG. 10, the HUD 100 of the present disclosure may be configured to separately recognize the first virtual image displayable area 310 generated by the first image display unit 10 and the second virtual image displayable area 320 generated by the second image display unit 20. Specifically, for example, the HUD 100 in this modified example may be constituted by separating an area on the display synthesizer 50 where the first display light 210 enters from the first image display unit 10 and an area on the display synthesizer 50 where the second display light 220 enters from the second image display unit 20.

Further, in the aforementioned embodiment, the first image display unit 10 for generating the first virtual image displayable area 310 and the second image display unit 20 for generating the second virtual image displayable area 320 are provided. However, the image display units may be a single unit. The HUD 100 in this modified example may adjust the angle 330 formed by the first virtual image displayable area 310 and the second virtual image displayable area 320 by projecting the projection light from a single projection unit (not illustrated) to a plurality of screens (display surfaces) (not illustrated) and rotating one of the screens with an actuator.

Further, in the aforementioned embodiment, the angle 330 formed by the first virtual image displayable area 310 and the second virtual image displayable area 320 is adjusted by adjusting the angle of the first virtual image displayable area 310 with respect to an actual scene. However, the angle 330 formed by the first virtual image displayable area 310 and the second virtual image displayable area 320 may be adjusted by respectively adjusting the angles of both the first virtual image displayable area 310 and the second virtual image displayable area 320 with respect to an actual scene and making the angle adjustment amount different.

Further, the first image display unit 10 may use a transmissive display panel such as a liquid crystal display element, a self-emitting display panel such as an organic EL element, a scanning display device for scanning a laser beam, or the like.

DESCRIPTION OF REFERENCE NUMERALS 1 vehicle
2 front windshield (transmissive reflector)
3 dashboard
4 viewpoint
5 actual scene
5W the information-imparting object
6 front information detector
7 viewpoint information detector
8 vehicle attitude detector
9 bus
10 first image display unit
20 second image generation unit
30 reflector (relay optics)
40 actuator 50 display synthesizer (relay optics)
60 concave mirror
70 control unit
71 processing unit
72 storage unit
73 interface (viewpoint information acquisition means, vehicle attitude information acquisition means, the position misalignment information acquisition means)
100 HUD (head up display)
200 display light
210 first display light
220 second display light
310 first virtual image displayable area
311 virtual image display area
312 virtual image blank area
320 second virtual image displayable area
V1 first virtual image
V2 second virtual image
330 angle
AX rotation axis
D image data
G the position misalignment information
7G viewpoint information
8G vehicle attitude information

The invention claimed is:

1. A head up display mounted on a vehicle, and displaying a first virtual image in a first virtual image displayable area overlapping an actual scene on the outside of the vehicle by projecting a first display light on a transmissive reflector, the head up display comprising:
   a first image display surface corresponding to the first virtual image displayable area and from which the first display light is emitted;
   relay optics that direct the first display light emitted from the first image display surface toward the transmissive reflector; and
   a Central Processing Unit (CPU) that functions as a control unit for enlarging the virtual image display area that defines the range for displaying the first virtual image in the first virtual image displayable area when a misalignment occurs in a relative position of the transmissive reflector and the actual scene as viewed from a viewer,
   wherein the virtual image display area is set in order to overlap in a specific area of the actual scene which is in a fixed positional relationship with the vehicle as viewed from the viewer in a normal state prior to an occurrence of the relative position misalignment of the transmissive reflector and the actual scene, and
   wherein the control unit enlarges the virtual image display area so as to overlap with at least a part of the specific area of the actual scene as viewed from the viewer when the relative position misalignment of the transmissive reflector and the actual scene occurs.

2. The head up display according to claim 1, wherein the control unit receives vehicle attitude information comprising information relating to a vehicle attitude of the vehicle, and
   wherein the control unit enlarges the virtual image display area based on the acquired vehicle attitude information.

3. The head up display according to claim 1, wherein the control unit receives viewpoint information comprising information relating to a viewpoint position of the viewer, and
   wherein the control unit enlarges the virtual image display area based on the acquired viewpoint information.

4. The head up display according to claim 1, wherein the control unit increases an amount of enlargement of the virtual image display area as an amount of the relative position misalignment of the transmissive reflector and the actual scene becomes large.

5. The head up display according to claim 1, wherein the control unit determines the enlargement direction in which the virtual image display area is enlarged in accordance with the direction of the relative position misalignment of the transmissive reflector and the actual scene, or determines the enlargement direction in which an amount of enlargement becomes larger than the other enlargement direction of the virtual image display area.

6. The head up display according to claim 1, wherein
   the control unit enlarges the virtual image display area so as to overlap with at least an entirety of the specific area of the actual scene as viewed from the viewer when the relative position misalignment of the transmissive reflector and the actual scene occurs.

7. The head up display according to claim 1, wherein the control unit reduces the enlarged virtual image display area when the relative position misalignment of the transmissive reflector and the actual scene continued for a predetermined period of time.

8. The head up display according to claim 7, wherein
   the control unit reduces the virtual image display area so as to overlap the enlarged virtual image display area with an entirety of the specific area of the actual scene as viewed from the viewer, when the relative position misalignment of the transmissive reflector and the actual scene continued for a predetermined period of time.

9. The head up display according to claim 1,
   wherein the head up display of claim 1 further displays a second virtual image in a second virtual image displayable area arranged in a position in which a distance from the viewer is different from the first virtual image displayable area by projecting a second display light to the transmissive reflector,
   wherein the CPU further functions as an angle adjustment unit which adjusts the relative angle between the first virtual image displayable area and the second virtual image displayable area by adjusting the angle in real space of the first virtual image displayable area, and
   wherein the angle adjustment unit adjusts the angle of the first virtual image displayable area in a direction in which the angle change of the first virtual image displayable area caused by the relative position misalignment of the transmissive reflector and the actual scene as viewed from the viewer decreases with respect to the actual scene.

10. The head up display according to claim 2, wherein the control unit receives viewpoint information comprising information relating to a viewpoint position of the viewer, and
   wherein the control unit enlarges the virtual image display area based on the acquired viewpoint information.

* * * * *